United States Patent
Brugger et al.

(10) Patent No.: US 12,421,986 B2
(45) Date of Patent: Sep. 23, 2025

(54) VALVE AND AIRCRAFT

(71) Applicant: Liebherr-Aerospace Lindenberg GmbH, Lindenberg (DE)

(72) Inventors: Ralf Brugger, Wangen (DE); Andreas Dürner, Lindenberg i.A. (DE); Thomas Sauterleute, Wangen (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 13 days.

(21) Appl. No.: 18/357,749

(22) Filed: Jul. 24, 2023

(65) Prior Publication Data
US 2024/0035492 A1    Feb. 1, 2024

(30) Foreign Application Priority Data
Jul. 27, 2022   (DE) ..................... 10 2022 118 879.5

(51) Int. Cl.
*F15B 13/04*     (2006.01)
*F16K 11/07*    (2006.01)

(52) U.S. Cl.
CPC ...... *F15B 13/0402* (2013.01); *F16K 11/0712* (2013.01)

(58) Field of Classification Search
CPC ......... Y10T 137/8667; Y10T 137/8671; F15B 13/0402; F16K 11/0712; F16K 11/07
See application file for complete search history.

(56) References Cited

U.S. PATENT DOCUMENTS

| | | | | |
|---|---|---|---|---|
| 789,026 | A * | 5/1905 | Huston | F15B 13/04 251/324 |
| 2,931,389 | A * | 4/1960 | Moog, Jr. | G05D 16/2097 137/625.62 |
| 3,195,574 | A | 7/1965 | Carls | |
| 5,240,041 | A * | 8/1993 | Garnjost | F15B 13/0438 137/625.62 |
| 5,535,773 | A * | 7/1996 | Deller | F15B 13/0402 91/420 |

(Continued)

FOREIGN PATENT DOCUMENTS

| | | |
|---|---|---|
| DE | 3734058 A1 | 4/1988 |
| DE | 29816431 U1 | 4/1999 |

(Continued)

OTHER PUBLICATIONS

Translation of DE29816431 retrieved from espacenet.com Oct. 1, 2024. (Year: 2024).*

*Primary Examiner* — Jessica Cahill
(74) *Attorney, Agent, or Firm* — McCoy Russell LLP

(57) ABSTRACT

The present disclosure relates to a valve, preferably a continuous valve comprising a spool and a spool sleeve, wherein the spool comprises a control surface and the spool sleeve comprises an opening, wherein the valve is configured in such a way that the control surface can cover the opening, wherein the spool can be positioned such that the control surface at least partially does not cover the opening, wherein the spool sleeve comprises a further opening, wherein the control surface can cover the further opening, wherein the spool can be positioned such that the control surface at least partially does not cover each of the opening and the further opening.

10 Claims, 3 Drawing Sheets

(56) References Cited

U.S. PATENT DOCUMENTS

| | | | |
|---|---|---|---|
| 6,408,807 B1 * | 6/2002 | Komazawa | F01L 1/3442 123/90.15 |
| 8,752,514 B2 * | 6/2014 | Schulze | F01L 1/34409 123/90.12 |
| 9,695,840 B2 | 7/2017 | Rabhi | |
| 2001/0022474 A1 * | 9/2001 | Tachibana | F16K 31/0613 310/15 |
| 2004/0244852 A1 * | 12/2004 | Cornea | F01L 1/34 137/625.69 |
| 2005/0178451 A1 * | 8/2005 | Inami | F16K 31/0613 137/625.65 |
| 2016/0040790 A1 * | 2/2016 | Mell | F15B 13/0402 137/625.48 |
| 2021/0010491 A1 * | 1/2021 | Reust | F15B 13/0402 |

FOREIGN PATENT DOCUMENTS

| | | | | |
|---|---|---|---|---|
| EP | 3553325 A1 * | 10/2019 | | B64C 13/40 |
| JP | 2012251558 A * | 12/2012 | | F04B 17/042 |

* cited by examiner

VALVE AND AIRCRAFT

CROSS REFERENCE TO RELATED APPLICATION

The present application claims priority to German Patent Application No. 10 2022 118 879.5 filed on Jul. 27, 2022. The entire contents of the above-listed application are hereby incorporated by reference for all purposes.

TECHNICAL FIELD

The present disclosure relates to a valve, preferably a continuous valve comprising a spool and a spool sleeve, wherein the spool comprises a control surface and the spool sleeve comprises an opening, wherein the valve is configured in such a way that the control surface can cover the opening, wherein the spool can be positioned such that the control surface at least partially does not cover the opening.

BACKGROUND

For example, to control hydraulic motors in aircrafts, such as on a flap/slat drive unit, control blocks with valves or hydraulic valves are used in the prior art.

Such a valve, referred to for example as a Main Control Valve (MCV), controls or regulates the flow of hydraulic fluid in a valve block for, for example, a hydraulic motor. FIG. 6 shows schematic circuit diagram of such a valve block B with an MCV arranged thereon and therein for a hydraulic motor M connected to the valve block B from the prior art. The valve block B comprises lines which are supplied with hydraulic fluid by the inlet SU. Through the outlet RE, the hydraulic fluid is discharged from the valve block B again, for example to close a larger hydraulic circuit. Likewise, the valve block comprises, for example, a hydraulic port POB for further consumers. The MCV comprises a spool SL, the movement of which can be used to control the supply of hydraulic fluid or hydraulic pressure to lines in the switching block B. The spool SL is centered by a spring assembly S. The switching block B comprises three solenoid valves or switching valves, Extend E, Retract R and Brake B, wherein by means of the solenoid valves E and R the spool SL of the MCV can be pressed into the corresponding position by applying the corresponding lines with a supply pressure. The spool SL then unblocks openings in a spool sleeve for the corresponding lines. By means of the spring assembly S and a clocked switching of the solenoids E and R, the spool SL can be held in intermediate positions, i.e. floating, whereby certain openings in the spool sleeve can be defined, i.e. partially opened, for example, and defined flow rates can be achieved. The position of the spool SL can be determined by a differential transformer LVDT.

This implementation requires multiple solenoid valves, a large number of chokes and a complex spring assembly. Each solenoid valve requires a relatively high switching current. The implementation of the hydraulic lines results in a relatively large and thus heavy valve block, with correspondingly high pressure losses in the lines.

For spool positions which do not correspond to a mechanical end position, the spool position is achieved by means of clocked switching of the solenoid valves. Due to the precision requirements a very large spool stroke is required. This increases the size of the MCV or the valve block.

SUMMARY

Against this background, the object underlying the present disclosure is to provide an improved valve, in particular a smaller, lighter, less expensive and simpler valve, in particular with less energy demand and higher hydraulic performance, i.e. with less pressure loss.

Said object is achieved by the subject-matter having the features described herein.

Accordingly, it is provided in accordance with the disclosure that the spool sleeve comprises a further opening, wherein the control surface can cover the further opening, wherein the spool can be positioned such that the control surface at least partially does not cover each of the opening and the further opening, respectively.

It is also conceivable that the control surface can completely cover or not cover the openings. Likewise, more than two openings can be provided, which can be covered or not covered by the control surface.

The valve is preferably used to control the flow for a hydraulic consumer, e.g. a hydraulic motor, in a high-lift system. In this case, the consumer requires for example, at least 2 discrete volume flows.

The control surface may also be referred to as the control edge. The control surface is preferably a surface uninterrupted by steps, edges or the like, which glides on the inner surface of the control sleeve.

The control surface preferably covers the opening in such a way that no fluid or only a negligible amount of fluid can pass through the opening.

Preferably, it is provided for the valve to have a flow characteristic line having at least one discrete step. Such a flow characteristic line can be generated by opening multiple openings.

It is conceivable that the openings were made by laser cutting.

In an advantageous embodiment, it is provided that the openings are spaced from each other, wherein the openings have a spacing of 0.1 mm to 1 mm, preferably a spacing of 0.1 mm to 0.6 mm or of 0.2 mm to 0.4 mm.

Preferably, the distance relates to the minimum distance of the openings. In other words, a web is preferably provided, which has the corresponding with between the openings.

It may be provided that the openings have a circular, rectangular, trapezoidal, oval, triangular or teardrop shape, the shape preferably having rounded corners.

It is conceivable, that the valve does not comprise any switching valves and/or springs.

Preferably, it is provided that the spool has a spool stroke of 0.5 mm to 3 mm, preferably 1 mm to 2 mm.

It can be provided that the valve is an electrohydraulic servo valve (EHSV) and can preferably be actuated with an actuating current of +/−10 mA.

It is conceivable that the valve is arranged on and/or in a valve block for a hydraulic consumer, preferably a motor or a cylinder.

The disclosure also relates to an aircraft comprising a valve according to the disclosure.

It is to be noted here that the terms "one" and "a" do not necessarily refer to exactly one of the elements, although this is a possible version, but can also denote a plural of the elements. Likewise, the use of the plural form also includes the presence of the element in question in singular form and, vice versa, the singular also includes several of the elements in question. Further, all of the features of the disclosure described herein may be claimed in any combination or in individually.

BRIEF DESCRIPTION OF THE FIGURES

Further advantages, features and effects of the present disclosure will be apparent from the following description of preferred exemplary embodiments with reference to the Figures, in which the same or similar components are indicated by the same reference characters. Shown are in.

DETAILED DESCRIPTION

Figure 1:
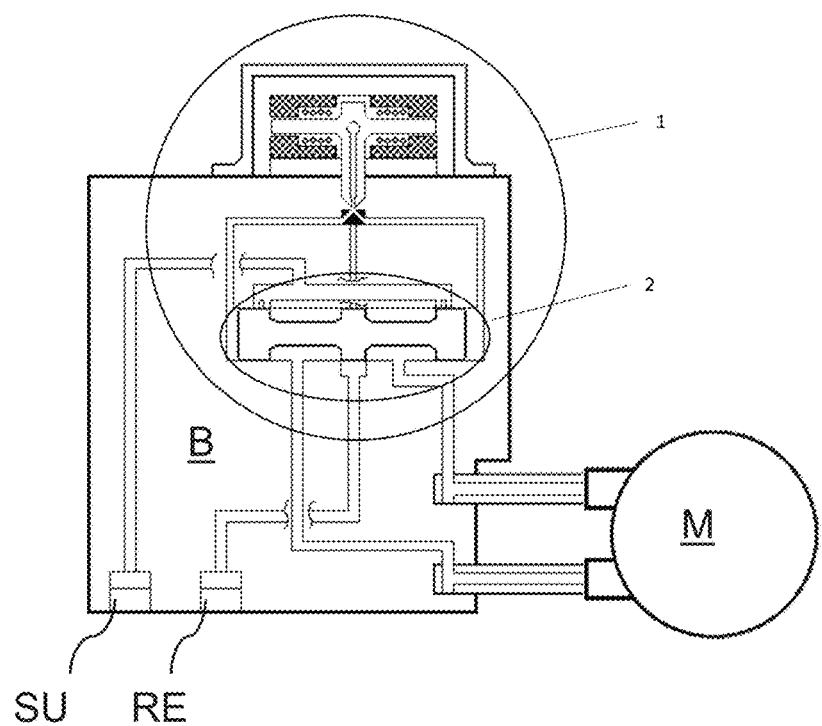
FIG. 1: A schematic circuit diagram of an embodiment of a valve block with a valve according to the disclosure and a motor.

FIG. 1 shows the schematic structure of a valve block B for a hydraulic motor M. Instead of an MCV, an electrohydraulic servo valve (EHSV) 1 is arranged on and in the valve block. A EHSV can implement control commands with very small electrical currents and thus unblock the flow to the motor.

The defined flow rates are implemented via the geometric design of the spool assembly 2 of the EHSV. In the direction of spool stroke, the control openings of the spool assembly are located one behind the other and very close to one another. Due to their small dimensions, the control openings can only be made by laser cutting. Preferably, the sinking and wire eroding are not considered as a method due to the dimensions and the heat input.

Instead of a spool stroke of hitherto approximately 7 mm, the functioning of the valve can now be implemented using a spool stroke of approximately 1 mm. This also allows for a reduced installation space, compared to the solution from prior art. As well, the switching dynamics is considerably improved. The compact design allows for a reduction in weight.

Figure 2:
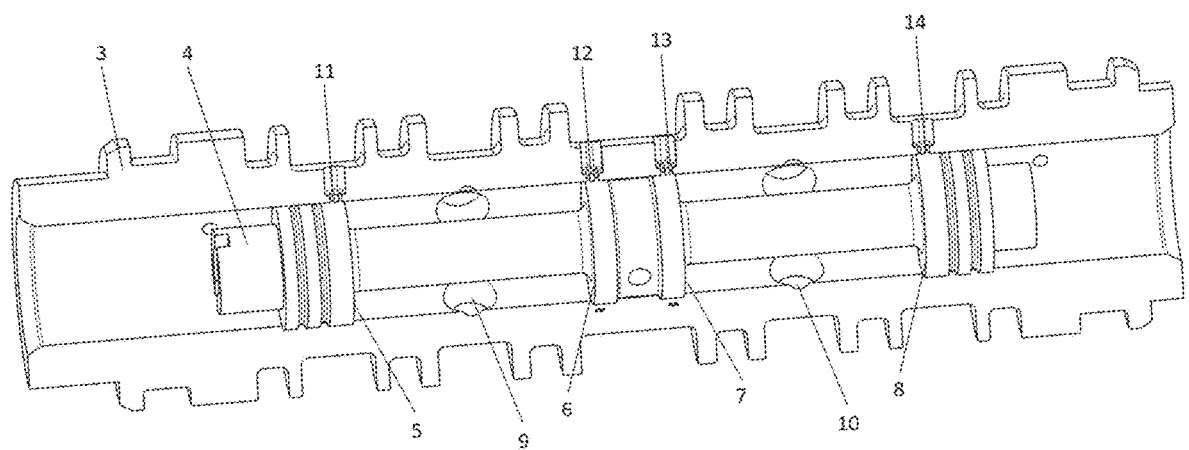
FIG. 2: a view of an embodiment of a spool of a valve according to the disclosure.

FIG. 2 shows the spool assembly of the EHSV. Said assembly comprises a spool 4 and a spool sleeve 3. The Figure shows the spool 4 in its neutral position. If the spool, starting from the neutral position, is displaced along its longitudinal axis relative to the spool sleeve 3, the control edges 5, 6, 7 and 8, depending on the spool stroke and the stroke direction, in each case unblock a or a group of control openings 11, 12, 13 and 14. This way, the working fluid can flow to the and from the consumer through the openings 9 and 10.

If the spool 4 is for example moved to the right with respect to the spool sleeve 3, working fluid having system pressure flows to the consumer, e.g. a motor or a hydraulic cylinder, through the control openings 14 and the openings 10. Expanded working fluid flows back through the openings 9 and the control openings 12 into the return line of the hydraulic system.

The consumer is either turned off or operated with two defined volumetric flow rates. In the turned off state, the spool 4 is in the intermediate position, and the control edges 5, 6, 7 and 8 cover the respective control openings or groups 11, 12, 13 and 14. Conventionally, certain flow rates are achieved in that a defined spool stroke is commanded. The respective control openings then accordingly open and enable the flow.

Figure 3:
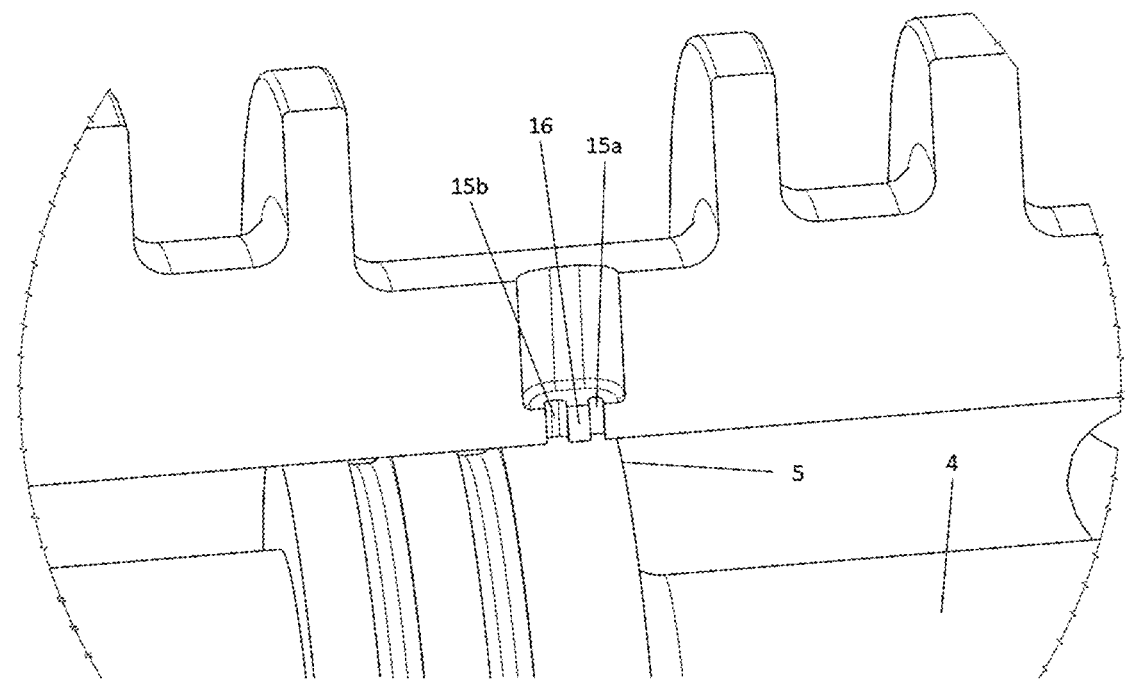
FIG. 3: a view of a detail of an embodiment of a spool of a valve according to the disclosure.

For example, the required volumetric flows are achieved by the size of control openings 15a and 15b located directly one behind the other and separated by a small web 16, as can be taken from FIG. 3. For achieving a predefined volumetric flow, the spool 4 is deflected in such a wax, that the control edges in each case unblock one or both control openings 15a and 15b. For the smallest defined flow rate, the spool 4 is for example controlled in such a way that the control edge 5 completely unblocks the control opening 15a. Therefore, the control edge 5 is located in the area of the web 16. Because the control edge only has to reach a certain region and no particularly exact position, the requirements for the continuous valve are reduced.

Figure 4:
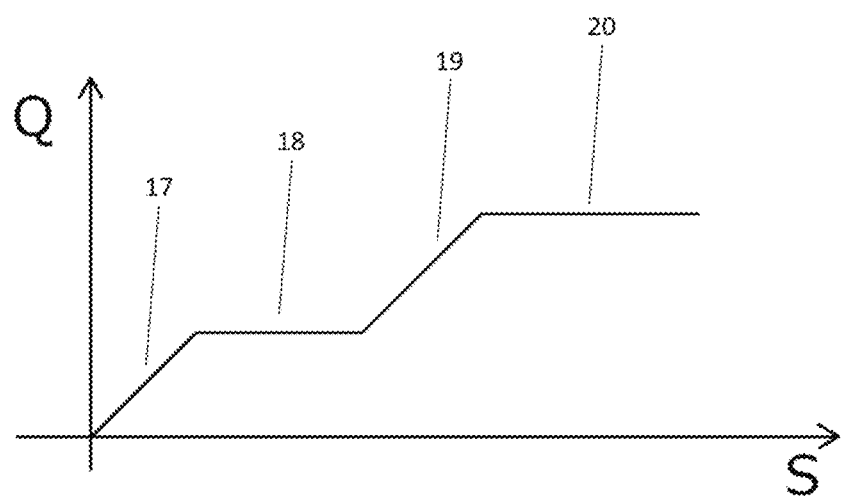
FIG. 4: a diagram of a flow curve of a valve according to the disclosure.

FIG. 4 shows the flow curve resulting from the arrangement of FIG. 3. In FIG. 4, the hydraulic flow Q is plotted above the spools stroke S. During the control edge 5 unblocking the control opening 15a, flow increases, as can be seen in the upward sloping portion 17 of the flow curve. When reaching the web 16, the flow remains constant over a portion of the spool stroke, as shows the constant portion 18 of the flow curve. Said flow value is a rated flow specified for the consumer. In order to achieve said rated flow, the spool is not to be on a proportional or linear characteristic curve in a highly-precise manner, but instead only has to reach a certain region. For the second defined rated flow, the spool is to be moved in such a way that the constant portion 20 of the flow curve is reached. This, in turn, is effected by the upward sloping portion 19 of the flow curve.

Figure 5:
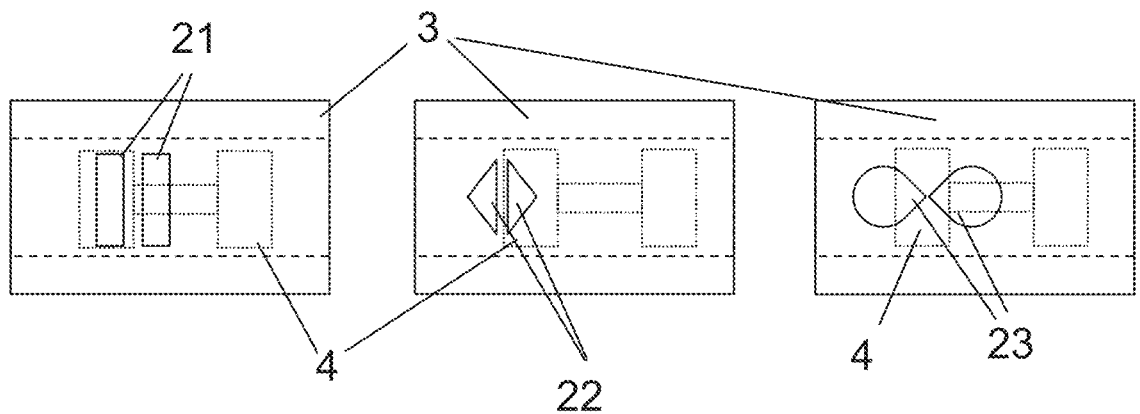
FIG. 5: schematic illustrations of openings of a valve according to the disclosure.
Figure 6:
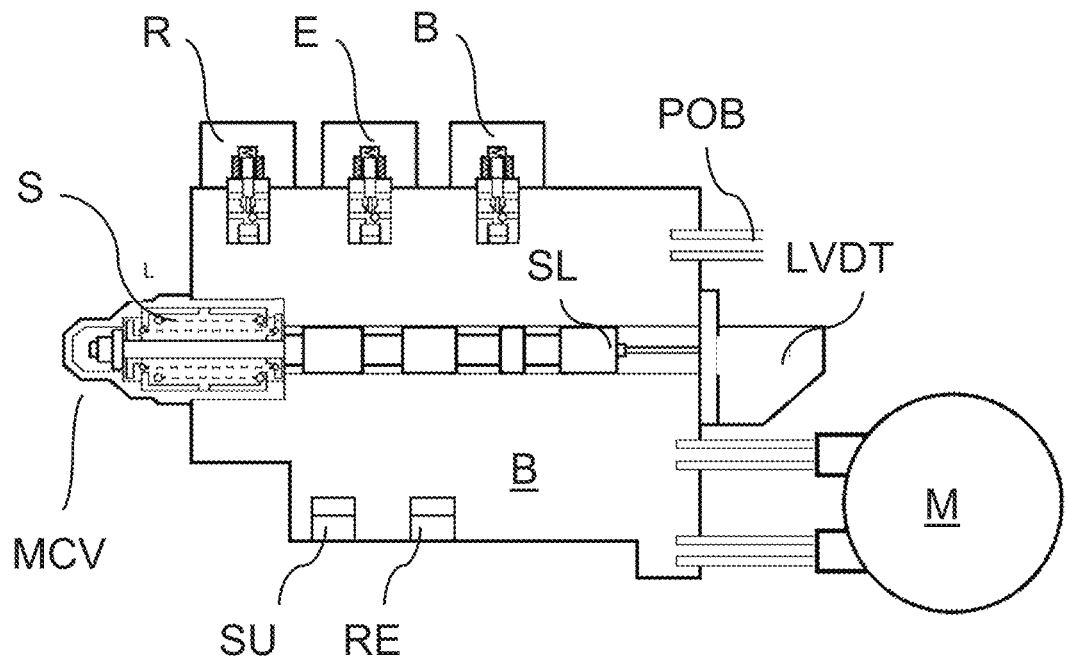
FIG. 6: a schematic circuit diagram of an exemplary embodiment of a valve from the prior art.

As is illustrated in FIG. 5, the openings can as well be configured as rectangles 21, triangles 22 or as droplets 23 merging into one another. The openings can have any desired shape.

By using a spool assembly having control openings located very closely one behind the other, in contrast to a mere switching valve, defined transients can be produced. These transients can be generated either by an arbitrary shape of the ports, by the control characteristic or by a combination of both. As a result, the flanks 17 and 19 shown in FIG. 4 can be altered using the geometries shown in FIG. 5.

This results in the following advantages for the disclosure, for example:

Owing to the control openings located one behind the other, moving the spool towards a very precisely defined point is no longer necessary. It is sufficient that the spool is in a certain region for achieving the required flow. Thereby, complex manufacturing processes in the region of the valve assembly can be dispensed with.

Owing to the use of a continuous valve, switch valves and a spring assembly can be dispensed with.

The current demand is significantly reduced. For example, only +/−10 mA instead of several amperes per solenoid valve are required to switch the valve.

Due to the high dynamics of the continuous valve, arbitrary control dynamics can be implemented by means of appropriate actuation.

FIGS. 2-3 are drawn to scale, although other relative dimensions may be used.

The invention claimed is:

1. Valve comprising a spool and a spool sleeve, wherein the spool comprises a control surface and the spool sleeve comprises a plurality of openings, the plurality of openings comprising:

a first opening comprising a first control opening and a second control opening, wherein the first control opening and the second control opening are located one directly behind the other and separated by a web, a second opening comprising a third control opening and a fourth control opening, wherein the third control opening and the fourth control opening are located one directly behind the other and separated by a web, a third opening comprising a fifth control opening and a sixth control opening, wherein the fifth control opening and the sixth control opening are located one directly behind the other and separated by a web, a fourth opening comprising a seventh control opening and an eighth control opening, wherein the seventh control opening and the eighth control opening are located one directly behind the other and separated by a web, wherein the valve is configured in such a way that the control surface can cover the each of the plurality of openings, wherein the spool can be positioned such that the control surface at least partially does not cover each of the plurality of openings and wherein a size of the control surface is greater than a size of each of the plurality of openings.

2. Valve according to claim 1, wherein the valve has a flow characteristic line having at least one discrete step.

3. Valve according to claim 1, wherein the control surface unblocks one or both of the first and second control openings, one or both of the third and fourth control openings, one or both of the fifth and sixth control openings, and one or both of the seventh and eighth control openings, and wherein the first, second, third, fourth, fifth, sixth, seventh, and eighth control openings are made by laser cutting.

4. Valve according to claim 3, wherein the control openings are spaced from each other, and wherein the control openings have a spacing of 0.1 mm to 1 mm.

5. Valve according to claim 3, wherein the control openings have a circular, rectangular, trapezoidal, oval, triangular or teardrop shape, and wherein the shape has rounded corners.

6. Valve according to claim 1, wherein the valve does not comprise any switching valves and/or springs.

7. Valve according to claim 1, wherein the spool has a spool stroke of from 0.5 mm to 3 mm.

8. Valve according to claim 1, wherein the valve is an electrohydraulic servo valve (EHSV) and can be actuated with an actuating current of +/−10 mA.

9. Valve according to claim 1, wherein the valve is arranged on and/or in a valve block for a hydraulic consumer, including a motor or a cylinder.

10. Aircraft comprising a valve according to claim 1.

* * * * *